(12) United States Patent
Edwards et al.

(10) Patent No.: US 8,407,595 B1
(45) Date of Patent: Mar. 26, 2013

(54) IMAGING SERVICE FOR AUTOMATING THE DISPLAY OF IMAGES

(75) Inventors: Eric Edwards, San Francisco, CA (US); Kurt Jonach, San Jose, CA (US); John Tree, San Francisco, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 1317 days.

(21) Appl. No.: 09/637,120

(22) Filed: Aug. 11, 2000

Related U.S. Application Data (60) Provisional application No. 60/181,779, filed on Feb. 11, 2000.

(51) Int. Cl.
*G06F 3/00* (2006.01)

(52) U.S. Cl. ........ 715/730; 715/712; 715/716; 715/723; 715/731; 715/732

(58) Field of Classification Search .......... 715/730–732, 715/719–721, 712, 716, 723; 345/726, 730, 345/716, 723, 731, 732, 719, 720, 721
See application file for complete search history.

(56) References Cited

U.S. PATENT DOCUMENTS

| | | | |
|---|---|---|---|
| 3,785,721 A | 1/1974 | Harsch | |
| 4,305,131 A | 12/1981 | Best | |
| 5,100,154 A | 3/1992 | Mullins | |
| 5,111,410 A | 5/1992 | Nakayama et al. | |
| 5,303,148 A | 4/1994 | Mattson et al. | |
| 5,327,521 A | 7/1994 | Savic et al. | |
| 5,477,264 A | 12/1995 | Sarbadhikari et al. | |
| 5,559,707 A | 9/1996 | DeLorme et al. | |
| 5,600,765 A | 2/1997 | Ando et al. | |
| 5,615,123 A | 3/1997 | Davidson et al. | |
| 5,634,012 A | 5/1997 | Stefik et al. | |
| 5,643,088 A | 7/1997 | Vaughn et al. | |
| 5,679,075 A | 10/1997 | Forrest et al. | |
| 5,682,525 A | 10/1997 | Bouve et al. | |
| 5,710,887 A | 1/1998 | Chelliah et al. | |
| 5,721,827 A | 2/1998 | Logan et al. | |
| 5,727,093 A | 3/1998 | Uchiyama et al. | |
| 5,727,201 A | 3/1998 | Burke | |
| 5,732,216 A | 3/1998 | Logan et al. | |
| 5,737,538 A | 4/1998 | Wilhite | |
| 5,740,549 A | 4/1998 | Reilly et al. | |
| 5,748,898 A | 5/1998 | Ueda | |
| 5,760,916 A | 6/1998 | Dellert et al. | |
| 5,768,142 A | 6/1998 | Jacobs | |

(Continued)

FOREIGN PATENT DOCUMENTS

JP 411119688 A 4/1999

OTHER PUBLICATIONS

Marko et al., Storytelling with Digital Photographs; Apr. 2000; 8 pages.*

(Continued)

*Primary Examiner* — William Bashore
*Assistant Examiner* — Linh K Pham
(74) *Attorney, Agent, or Firm* — Blakely, Sokoloff, Taylor & Zafman LLP (57) ABSTRACT

An imaging service creates a visual presentation. The imaging service accesses images of a location, arranges them such that they create a desired visual effect when displayed, and combines them in a visual presentation. The imaging service may employ a client/server system, in which case images and information are uploaded from a client, and the visual presentation is downloaded to the client. The imaging service may also receive compensation from a computer user for using the imaging service.

33 Claims, 3 Drawing Sheets

U.S. PATENT DOCUMENTS

| | | | |
|---|---|---|---|
| 5,768,528 | A | 6/1998 | Stumm |
| 5,771,354 | A | 6/1998 | Crawford |
| 5,781,665 | A | 7/1998 | Cullen et al. |
| 5,794,006 | A | 8/1998 | Sanderman |
| 5,802,292 | A | 9/1998 | Mogul |
| 5,819,092 | A | 10/1998 | Ferguson et al. |
| 5,845,062 | A | 12/1998 | Branton, Jr. et al. |
| 5,845,281 | A | 12/1998 | Benson et al. |
| 5,852,450 | A | 12/1998 | Thingvold |
| 5,855,516 | A | 1/1999 | Eiba |
| 5,857,074 | A | 1/1999 | Johnson |
| 5,864,329 | A | 1/1999 | Hirokawa |
| 5,872,637 | A | 2/1999 | Nakanishi |
| 5,880,778 | A | 3/1999 | Akagi |
| 5,881,168 | A | 3/1999 | Takaoka et al. |
| 5,884,280 | A | 3/1999 | Yoshioka et al. |
| 5,889,868 | A | 3/1999 | Moskowitz et al. |
| 5,918,009 | A | 6/1999 | Gehani et al. |
| 5,923,846 | A | 7/1999 | Gage et al. |
| 5,937,392 | A | 8/1999 | Alberts |
| 5,940,600 | A | 8/1999 | Staats et al. |
| 5,940,806 | A * | 8/1999 | Danial ............................ 705/26 |
| 5,942,969 | A | 8/1999 | Wicks |
| 5,944,769 | A | 8/1999 | Musk et al. |
| 5,948,040 | A | 9/1999 | DeLorme et al. |
| 5,948,061 | A | 9/1999 | Merriman et al. |
| 5,949,875 | A | 9/1999 | Walker et al. |
| 5,960,409 | A | 9/1999 | Wexler |
| 5,963,664 | A | 10/1999 | Kumar et al. |
| 5,968,120 | A | 10/1999 | Guedalia |
| 5,970,143 | A | 10/1999 | Schneier et al. |
| 5,974,451 | A | 10/1999 | Simmons |
| 5,982,891 | A | 11/1999 | Ginter et al. |
| 5,982,944 | A | 11/1999 | Vaidyanathan et al. |
| 5,983,200 | A | 11/1999 | Slotznick |
| 5,991,740 | A | 11/1999 | Messer |
| 6,005,548 | A | 12/1999 | Latypov et al. |
| 6,005,987 | A | 12/1999 | Nakamura et al. |
| 6,006,197 | A | 12/1999 | d'Eon et al. |
| 6,006,231 | A | 12/1999 | Popa |
| 6,011,537 | A | 1/2000 | Slotznick |
| 6,014,681 | A | 1/2000 | Walker et al. |
| 6,014,701 | A | 1/2000 | Chaddha |
| 6,018,761 | A | 1/2000 | Uomini |
| 6,021,433 | A | 2/2000 | Payne et al. |
| 6,023,701 | A | 2/2000 | Malik et al. |
| 6,026,371 | A | 2/2000 | Beck et al. |
| 6,035,323 | A | 3/2000 | Narayen et al. |
| 6,041,316 | A | 3/2000 | Allen |
| 6,044,181 | A | 3/2000 | Szeliski et al. |
| 6,058,379 | A | 5/2000 | Odom et al. |
| 6,058,428 | A | 5/2000 | Wang et al. |
| 6,067,095 | A | 5/2000 | Danieli |
| 6,074,299 | A | 6/2000 | Cohen |
| 6,076,077 | A | 6/2000 | Saito |
| 6,081,278 | A | 6/2000 | Chen |
| 6,085,195 | A | 7/2000 | Hoyt et al. |
| 6,085,249 | A | 7/2000 | Wang et al. |
| 6,088,702 | A | 7/2000 | Plantz et al. |
| 6,097,389 | A | 8/2000 | Morris et al. |
| 6,102,406 | A | 8/2000 | Miles et al. |
| 6,102,796 | A | 8/2000 | Pajitnov et al. |
| 6,109,923 | A | 8/2000 | Rothenberg |
| 6,123,362 | A | 9/2000 | Squilla et al. |
| 6,144,726 | A | 11/2000 | Cross |
| 6,147,742 | A | 11/2000 | Bell et al. |
| 6,169,544 | B1 | 1/2001 | Onoda |
| 6,178,258 | B1 | 1/2001 | Sugimoto |
| 6,202,061 | B1 | 3/2001 | Khosla et al. |
| 6,215,526 | B1 | 4/2001 | Barton et al. |
| 6,216,112 | B1 | 4/2001 | Fuller et al. |
| 6,222,947 | B1 | 4/2001 | Koba |
| 6,224,486 | B1 | 5/2001 | Walker et al. |
| 6,237,010 | B1 | 5/2001 | Hui et al. |
| 6,272,231 | B1 | 8/2001 | Maurer et al. |
| 6,282,330 | B1 | 8/2001 | Yokota et al. |
| 6,301,555 | B2 | 10/2001 | Hinderks |
| 6,301,586 | B1 * | 10/2001 | Yang et al. ............................ 1/1 |
| 6,312,337 | B1 | 11/2001 | Edwards et al. |
| 6,313,835 | B1 | 11/2001 | Gever et al. |
| 6,324,545 | B1 | 11/2001 | Morag |
| 6,333,752 | B1 | 12/2001 | Hasegawa et al. |
| 6,336,052 | B1 | 1/2002 | Ouellet et al. |
| 6,340,971 | B1 * | 1/2002 | Janse et al. ..................... 345/721 |
| 6,343,738 | B1 | 2/2002 | Ogilvie |
| 6,358,341 | B1 | 3/2002 | Bergquist |
| 6,362,900 | B1 | 3/2002 | Squilla et al. |
| 6,369,835 | B1 * | 4/2002 | Lin .............................. 715/726 |
| 6,369,837 | B1 | 4/2002 | Schirmer |
| 6,396,963 | B2 | 5/2002 | Shaffer et al. |
| 6,408,301 | B1 | 6/2002 | Patton et al. |
| 6,411,744 | B1 | 6/2002 | Edwards |
| 6,431,448 | B1 * | 8/2002 | Nelson et al. ............ 235/462.13 |
| 6,434,579 | B1 | 8/2002 | Shaffer et al. |
| 6,437,797 | B1 | 8/2002 | Ota |
| 6,463,468 | B1 | 10/2002 | Buch et al. |
| 6,469,711 | B2 * | 10/2002 | Foreman et al. .............. 345/723 |
| 6,484,189 | B1 * | 11/2002 | Gerlach et al. ................. 345/730 |
| 6,496,851 | B1 | 12/2002 | Morris et al. |
| 6,509,910 | B1 | 1/2003 | Agarwal et al. |
| 6,512,570 | B2 | 1/2003 | Garfinkle et al. |
| 6,522,418 | B2 | 2/2003 | Yokomizo et al. |
| 6,546,556 | B1 | 4/2003 | Kataoka et al. |
| 6,567,983 | B1 * | 5/2003 | Shiimori ....................... 725/105 |
| 6,571,221 | B1 * | 5/2003 | Stewart et al. .................. 705/52 |
| 6,571,255 | B1 * | 5/2003 | Gonsalves et al. ......... 707/104.1 |
| 6,573,927 | B2 | 6/2003 | Parulski et al. |
| 6,578,014 | B1 | 6/2003 | Murcko, Jr. |
| 6,583,799 | B1 | 6/2003 | Manolis et al. |
| 6,590,586 | B1 | 7/2003 | Swenton-Wall et al. |
| 6,636,648 | B2 | 10/2003 | Loui et al. |
| 6,643,663 | B1 | 11/2003 | Dabney et al. |
| 6,686,918 | B1 | 2/2004 | Cajolet et al. |
| 6,747,674 | B1 * | 6/2004 | Asami .......................... 715/721 |
| 6,795,863 | B1 * | 9/2004 | Doty, Jr. ....................... 709/231 |
| 6,892,351 | B2 * | 5/2005 | Vasudevan et al. ........... 715/716 |
| 2001/0032229 | A1 | 10/2001 | Hulls et al. |
| 2001/0034646 | A1 | 10/2001 | Hoyt et al. |
| 2001/0037205 | A1 | 11/2001 | Joao |
| 2002/0052785 | A1 | 5/2002 | Tenenbaum |
| 2002/0059364 | A1 | 5/2002 | Coulthard et al. |
| 2002/0118182 | A1 | 8/2002 | Luther Weindorf |
| 2003/0093493 | A1 | 5/2003 | Watanabe et al. |
| 2003/0133019 | A1 * | 7/2003 | Higurashi et al. ......... 348/218.1 |
| 2003/0163431 | A1 | 8/2003 | Ginter et al. |

OTHER PUBLICATIONS

Yagawa et al., The Digital Album: A Personal File-tainment System; IEEE; Sep. 1996; 8 pages.*

Jeon et al., Smart digital Photo Frames; Carnegie Mellon University; Jan. 1, 2006; 16 pages.*

No Author Known, "Game Commander. User's Guide", Mindmaker, Inc. Version 1.0, 9pp., 1998.

No Author Known, "Assitive Computer Technology for Windows 98 Training Manual", High Tech Center Training Unit, http://fhda.edu/guides/act98files/act98, 8 pp., 2002.

Yagawa, et al., "The Digital Album: A Personal File-tainment System." IEEE Proceedings of Multimedia 96, pp. 433-439.

PCT Search Report dated Apr. 26, 2001, 3 pages.

ImageID press release, "Image ID announces AtraCamTM: the amusement-photography system for the Internet age", Jan. 31, 2000.

Website at http://www.voyeurweb.com dated Jan. 17, 1999, as archived at http://web.archive.org/web/1990117031200/voy.voyeurweb.com/main/Pictures.html.

"Pictra first to make publishing and sharing photo albums over Internet a snap for PC users; award-winning software offers easy, fun way to create digital photo albums to share over", PictraAlbum, May 12, 1997, Business Wire, www.highbeam.com/library/docfree.asp?, 4 pgs.

Robert E. Calem, "Web-Based Photo Albums Let World See Your Slide Show", Aug. 19, 1997, New York Times Company, 3 pgs.

Glenn McDonald, "Pictra Puts Your Photo Album On The Web For Free", Friday, Jun. 13, 1997, PC World, www.pcworld.com/resource/printable/article.aid,4885,00.asp, 2 pgs.

Armin Bruderlin, Lance Williams: "Motion Signal Processing," Sep. 1995, Proceedings of the $22^{nd}$ Annual Conference on Computer Graphics and Interactive Techniques, pp. 97-104.

* cited by examiner

IMAGING SERVICE FOR AUTOMATING THE DISPLAY OF IMAGES

RELATED APPLICATIONS

This application claims the benefit of U.S. Provisional Application No. 60/181,779, filed Feb. 11, 2000.

FIELD OF THE INVENTION

This invention relates generally to imaging services, and more particularly to automating the display of a plurality of images to create a visual presentation.

COPYRIGHT NOTICE/PERMISSION

A portion of the disclosure of this patent document may contain material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright© 1999, Sony Electronics Inc., All Rights Reserved.

BACKGROUND OF THE INVENTION

Personal computers can execute programs that display visual presentations such as motion pictures. Devices such as scanners and digital cameras enable computer users to capture images, load them into their computers, and view them using output devices such as monitors or printers. Furthermore, computers users can share pictures with friends over communications networks by using e-mail. As loading, manipulating, and viewing visual images on personal computers becomes easier and more popular, computer users may wish to create more sophisticated presentations of these images. For example, computer users may wish to create a visual presentation that zooms into or away from a location or that pans around a location. The visual presentation could be in the form of a motion picture, a vertical morph, or a holograph.

Personal computers can display such visual presentations, but users face significant difficulties when trying to create them. Creating the visual presentation requires accessing a number of pictures of the location, modifying them, arranging them, and combining them. Performing these steps requires a high degree of technical knowledge that most computer users do not possess. Furthermore, performing these steps is time-consuming, even for a computer user who has a high level of technical ability. Therefore, an imaging service is needed to perform the technically difficult and time-consuming tasks associated with automating the display of a plurality of images to create a visual presentation.

SUMMARY OF THE INVENTION

The invention is an imaging service that automates the display of a plurality of images to create a visual presentation. The imaging service accesses images from a client computer, from a database, or from both. It then arranges the images according to a specified characteristic and combines them in a visual presentation. In an embodiment of the invention, the computer user can specify a number of parameters for controlling the appearance of the visual presentation. In another embodiment of the invention, the imaging service modifies the images so they are consistent in appearance. In a further embodiment, the imaging service receives compensation before sending the visual presentation to a client.

The imaging service greatly simplifies the process of creating a visual presentation that displays multiple images of a location selected by a computer user. To use the imaging service, the computer user is required to perform only basic and routine tasks on his/her computer. If the computer user can load a picture into his/her computer using a digital camera or a scanner and can use the Internet, then he/she will be able to create sophisticated visual presentations using the imaging service. Furthermore, the imaging service accelerates the process of creating visual presentations by quickly performing tasks that otherwise would be tedious and time consuming.

The present invention describes systems, clients, servers, methods, and computer-readable media of varying scope. In addition to the aspects and advantages of the present invention described in this summary, further aspects and advantages of the invention will become apparent by reference to the drawings and by reading the detailed description that follows.

DETAILED DESCRIPTION OF THE INVENTION

Figure 1:
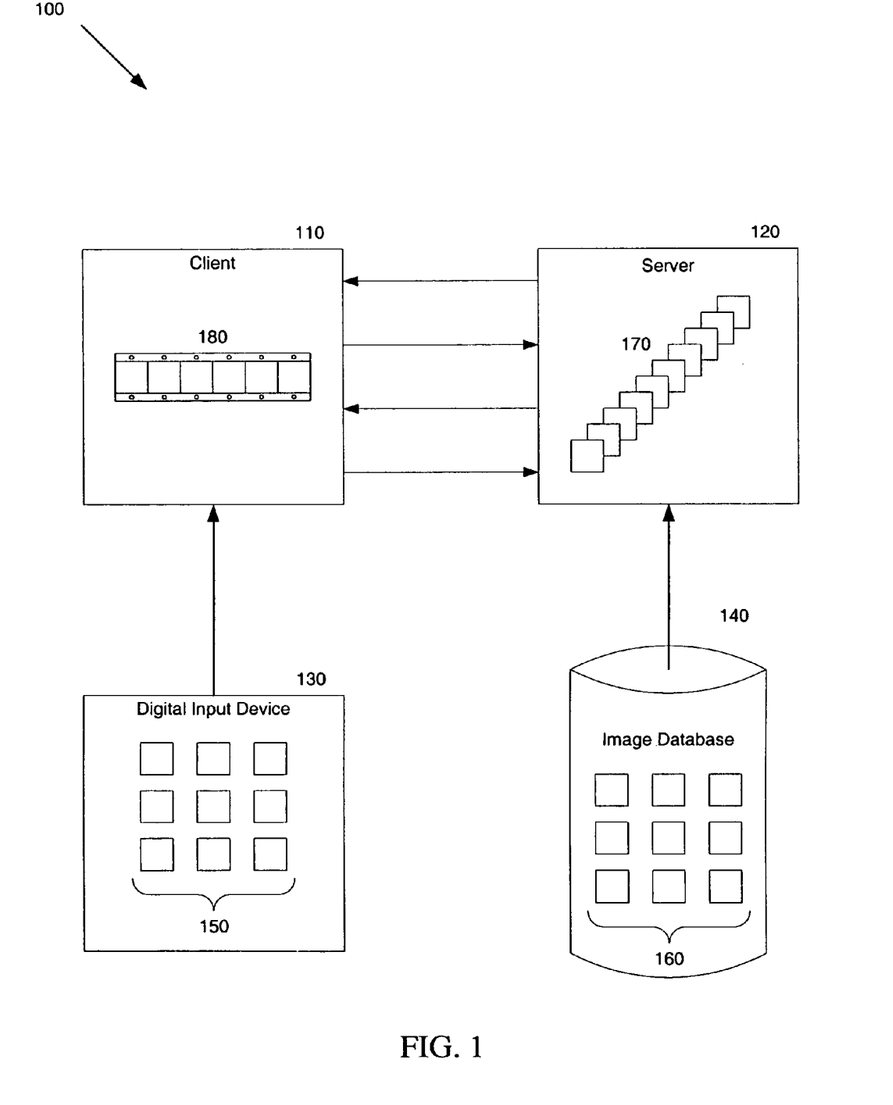
FIG. 1 is a diagram illustrating a system-level overview of an embodiment of the invention.

A system level overview of the operation of an embodiment of the imaging service 100 is described by reference to FIG. 1. Captured images 150 and database images 160 are combined to create a visual presentation 180. This system level overview describes an embodiment of the imaging service 100 employing a client/server system. However, other embodiments of the imaging service 100 will be readily apparent to one of skill in the art and fall within the scope of the present invention.

The imaging service 100 includes a client 110 and a server 120. A digital input device 130 is connected to the client 110. A computer user loads captured images 150 into the client 110 using the digital input device 130. In one embodiment, the digital input device 130 is a digital camera. The computer captures the captured images 150 with a digital camera, which stores the captured images 150 in digital form so that they can be loaded directly into the client 110. In another embodiment, the digital input device 130 is a scanner. The computer user captures the captured images 150 with a conventional camera and uses the scanner to load the captured images 150 into the client 110. The captured images 150 are saved in an appropriate file format, such as a Joint Photographic Experts Group (JPEG) file, a Graphics Interchange Format (GIF) file, or a Portable Network Graphics (PNG) file. The operation of digital cameras and scanners, as well as the various file formats for saving pictures in a computer, are well known to those of skill in the art.

The imaging service 100 also includes an image database 140. The image database 140 contains a number of database images 160 that are accessed by the server 120. The database images 160 also are stored in an appropriate file format for pictures, such as a JPEG file, a GIF file, or a PNG file. In one embodiment of the invention, the database 140 is located in the server 120. In another embodiment, the database 140 is located on another server directly coupled to the server 120. In another embodiment, the database 140 is located in another server connected to the server 120 through a Local Area Network (LAN). In yet another embodiment, the database 140 is located in another server that is connected to the Internet. Numerous government and private organizations maintain databases containing satellite images of various locations on Earth. For example, TerraServer® maintains an extensive database containing high-resolution images of many cities throughout the United States.

Captured images 150 and database images 160 are arranged in a series of presentation images 170. The presentation images 170 are combined to create a visual presentation 180. In one embodiment, the computer user can choose among a variety of formats for the visual presentation. The computer user may choose to make the visual presentation a motion picture. The visual presentation can be a Quick-Time™ movie file, a Moving Picture Experts Group (MPEG) file, or an Audio Video Interleaved (AVI) file. Numerous multimedia programs may be used to create a motion picture, and such programs are well known to those having skill in the art. Alternatively, the computer user may choose to make the visual presentation a vertical morph or a holographic image.

Figure 2:
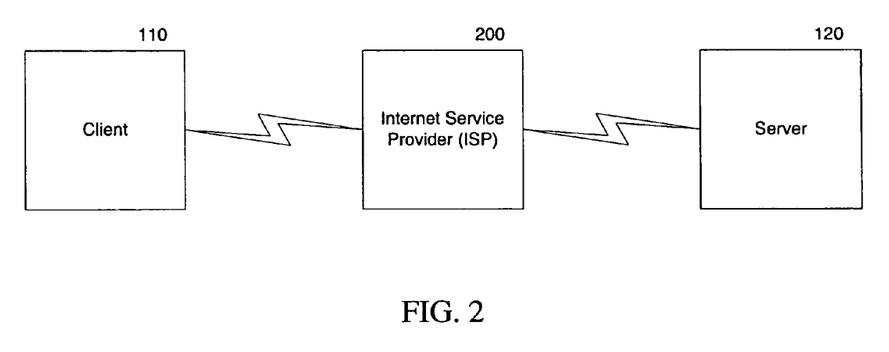
FIG. 2 is a diagram illustrating one embodiment of an operating environment suitable for practicing the invention.

In one embodiment, shown in FIG. 2, the operating environment for the imaging service includes a client 110 and a server 120 connected to an Internet Service Provider (ISP) 200. Connection to the ISP 200 facilitates communication between the client 110 and the server 120 over the Internet. It is readily apparent that the present invention is not limited to Internet access and Internet web-based sites. In another embodiment, a stand-alone computer performs the imaging service. In another embodiment, the client and the server are directly coupled. In a further embodiment, the client and the server are connected through a Local Area Network (LAN). The different operating environments in which multiple computers can communicate with each other are well known to those of skill in the art.

Figure 3:
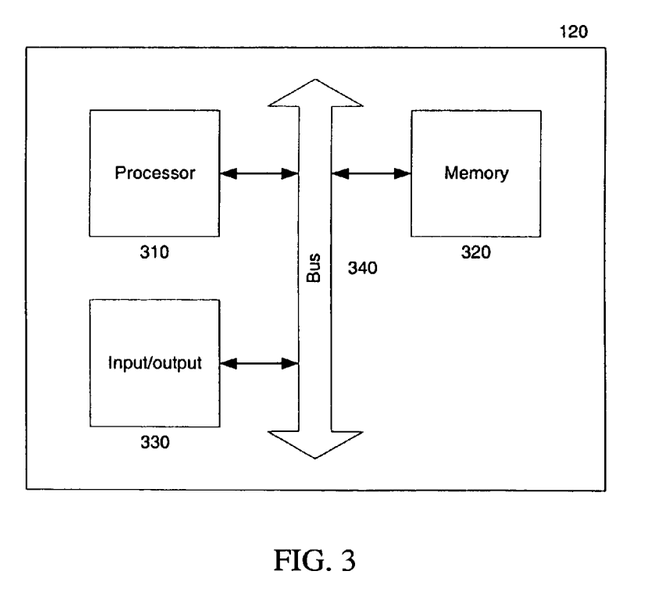
FIG. 3 is a diagram illustrating one embodiment of a computer system suitable for practicing the invention.

One embodiment of a server 120 is illustrated in FIG. 3. The server 120 includes a processor 310, memory 320, and input/output devices 330. The processor 310, memory 320, and input/output devices 330 are connected through a bus 300. The memory 320 is configured to store instructions which, when executed by the processor 310, perform the method described herein. The memory 320 may also store the captured image and database images used in the method described herein. Input/output devices 330 may include a keyboard, a mouse or other pointing device, a digital camera, a scanner, a disk drive, a monitor, and a printer.

The system level overview of the operation of an embodiment of the invention has been described in this section of the detailed description. While the invention is not limited to any particular arrangement of computer systems and components, for sake of clarity a simplified arrangement has been described.

Figure 4:
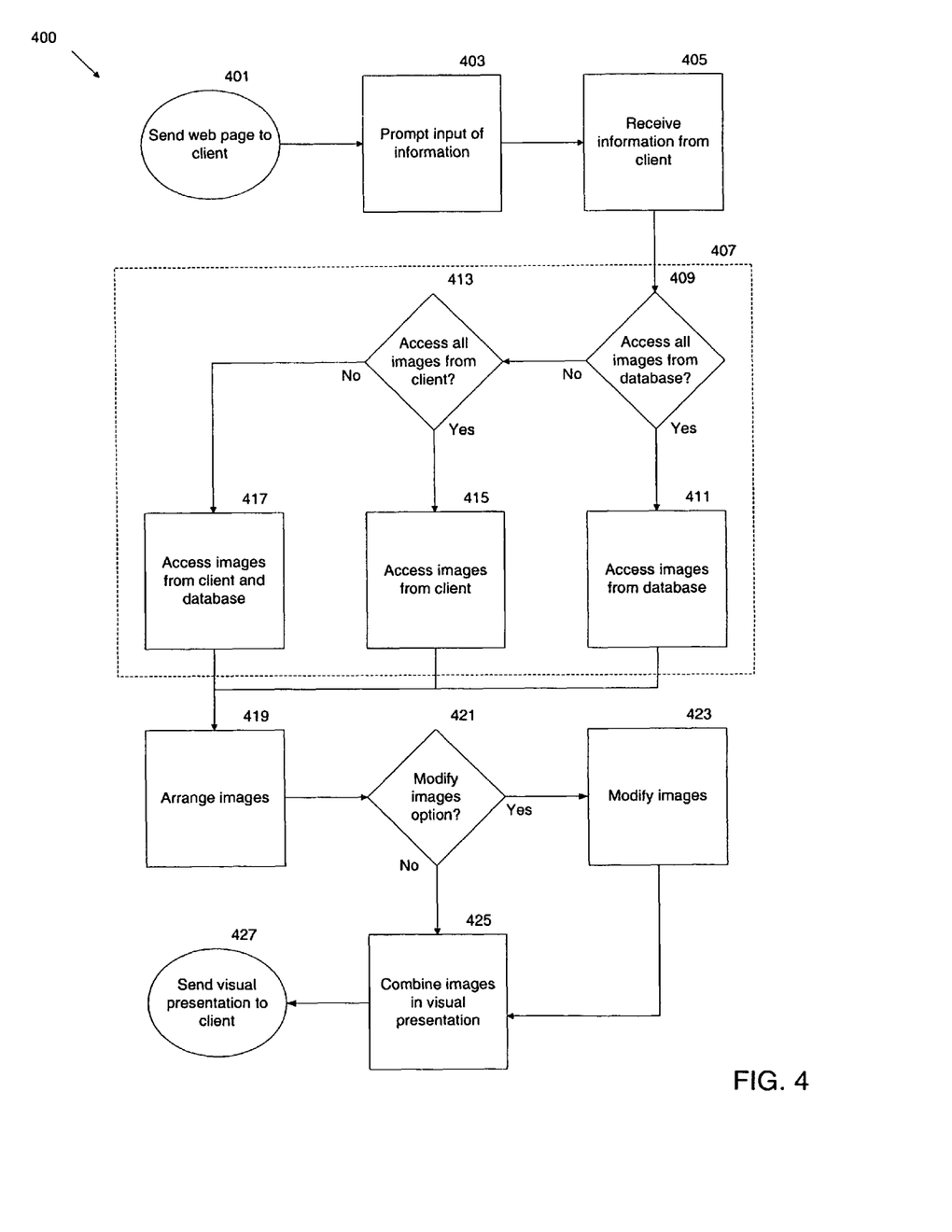
FIG. 4 is a flowchart of a method to be performed by a server according to an embodiment of the invention.

Next, the particular methods of the invention are described in terms of computer software with reference to a flowchart illustrated in FIG. 4. The methods to be performed by the computer constitute computer programs made up of computer-executable instructions. Describing the methods by reference to a flowchart enables one skilled in the art to develop programs including instructions to carry out the methods on a suitable computer (the processor of the computer executing the instructions from computer-readable media). If written in a programming language conforming to a recognized standard, such instructions can be executed on a variety of hardware platforms and for interface to a variety of operating systems. In addition, the present invention is not described with reference to any particular programming language. It will be appreciated that a variety of programming languages may be used to implement the teachings of the invention as described herein. Furthermore, it is common in the art to speak of software, in one form or another (e.g., program, procedure, process, application, module, logic . . . ), as taking an action or causing a result. Such expressions are merely a shorthand way of saying that execution of the software by a computer causes the processor of the computer to perform an action or a-produce a result.

Referring to FIG. 4, the acts to be performed by a server system performing the imaging service are shown. The server sends a web page for the imaging service to the client 401. The web page provides instructions to the computer user for using the imaging service and prompts the computer user to input various types of information 403. The web page instructs the computer user to specify the source of the images that are used to create the visual presentation. It enables the computer user to specify whether the visual presentation includes only captured images, only database images, or a combination captured images and database images. Additionally, the web page instructs the computer user to input location information such as a street address or location coordinates if the user wants the visual presentation to include any database images. Furthermore, the web page instructs the computer user to specify a characteristic by which the images are arranged. For example, the computer user may specify distance or magnification if he/she wants the visual presentation to zoom into or away from a location. Alternatively, the computer user may specify perspective or angle if he/she wants the visual presentation to pan around a location.

In alternate embodiments of the invention, the web page instructs the computer user to enter additional information relating to the appearance of the visual presentation. In one embodiment, the web page instructs the computer user to specify the type of visual presentation that the imaging service creates. For example, the computer user could choose to view the visual presentation as a motion picture, a vertical morph, or a hologram. In another embodiment, the web page instructs the computer user to specify how quickly the visual presentation zooms in or out, or how quickly the visual presentation pans around the location. In yet another embodiment, the web page instructs the computer user to specify whether the visual presentation stops during zooming or panning. In a further embodiment, the web page instructs the computer user to specify whether the images resolve or fade during the visual presentation. In an even further embodiment, the web page instructs the computer user to specify whether the visual presentation appears in black-and-white or in color.

After the computer user inputs the necessary information and follows the instructions on the web page, the server receives the information from the client 405. Then, the server accesses presentation images according to the information inputted by the computer user 407. If the computer user specified that the visual presentation include only database images 409, the server accesses all of the presentation images from a database 411. Alternatively, if the computer user specified that the visual presentation include only captured images, the server accesses all of the presentation images from the client. If the computer user specified that the visual presentation include both captured images and database images, the server accesses the presentation images both from a database and from the client 417.

The server arranges the presentation images according to the characteristic specified by the computer user 419. If the computer user chose distance or magnification as the characteristic, the server arranges the presentation images such that the visual presentation zooms into or away from the desired location. Alternatively, if the computer user chose perspective or angle as the characteristic, the server arranges the presentation images such that the visual presentation pans around the desired location.

In one embodiment, the imaging service can modify the presentation images to be consistent in size, color, exposure, and other attributes 421. The modification may be necessary to create a visually attractive and uniform presentation, especially if the visual presentation includes both captured images and database images. The imaging service modifies the images using image-smoothing technology to create seamless transitions between the presentation images as they are displayed in the visual presentation 423. The server combines the presentation images in a visual presentation 425. Finally, the online service then sends the visual presentation to the client 427.

In an alternate embodiment, the online service requires compensation before the server sends the visual presentation to the client. The server can request payment at various points during the process of performing the online service. The payment amount may vary depending upon the options selected by the computer user. For example, the online service may require a higher payment if the computer user wants to modify the images. Alternatively, the online service may require a higher payment if the presentation images are accessed from a database rather than being uploaded from a client. The server may wait until receiving confirmation of payment before proceeding to the next step in the process or before sending the visual presentation to the client.

The particular methods performed by a server system of an embodiment of the invention have been described. The method performed by the server has been shown by reference to a flowchart illustrated in FIG. 4, including all the acts from 401 until 427.

CONCLUSION

A system and method for creating a visual presentation of zooming into or away from a picture has been described. Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention.

For example, those of ordinary skill within the art will appreciate that the invention can be practiced without using a client/server system. The imaging service can be performed on a stand-alone computer or on directly coupled computers. Furthermore, the client/server system is not limited to computers connected to the Internet through an ISP. The client and server can be connected to a LAN. The terminology used in this application with respect to a method for creating a zoom effect is meant to include all of these environments. Therefore, it is manifestly intended that this invention be limited only by the following claims and equivalents thereof.

What is claimed is:

1. A method for displaying images comprising:
   specifying at least one source of a plurality of sources from which to access a plurality of presentation images to be displayed in a visual presentation, the plurality of sources including a remote source and a local source;
   accessing a plurality of presentation images from the one or more specified sources by a server, one or more of the plurality of presentation images having inconsistent presentation attributes;
   arranging the plurality of presentation images by the server according to at least one characteristic provided by a client;
   organizing the plurality of presentation images in the visual presentation by the server, wherein organizing includes automatically modifying the inconsistent presentation attributes of the one or more of the plurality of presentation images to have consistent presentation attributes, wherein modifying the inconsistent presentation attributes of the one or more of the plurality of presentation images includes modifying exposure of the one or more of the plurality of presentation images to be consistent;
   requesting and receiving compensation from the client before the visual presentation is sent to the client, an amount of compensation varies depending on which sources of the plurality of sources are accessed to retrieve the plurality of presentation images, where the remote source is more expensive to access than the local source; and
   transmitting the visual presentation from the server to the client.

2. The method of claim 1 further comprising:
   selecting the at least one characteristic being from the group consisting of a distance, a perspective, a magnification, and an angle.

3. The method of claim 2, wherein prior to accessing the plurality of presentation images, the method further comprises:
   specifying how quickly the visual presentation zooms in or out if the distance or magnification characteristic from the group is selected.

4. The method of claim 2, wherein prior to accessing the plurality of presentation images, the method further comprises:
   specifying how quickly the visual presentation pans around a location if the perspective or angle characteristic from the group is selected.

5. The method of claim 1, wherein modifying the inconsistent presentation attributes of the one or more of the plurality of presentation images includes modifying size for the one or more of the plurality of presentation images to be consistent.

6. The method of claim 1 wherein the images are digitalized images captured by a digital camera.

7. The method of claim 1 wherein accessing the plurality of presentation images comprises:
   uploading the plurality of presentation images from the client, the client being the local source.

8. The method of claim 1 wherein accessing the plurality of presentation images comprises:
   loading the plurality of presentation images from a database, the database being the remote source.

9. The method of claim 1 wherein accessing the plurality of presentation images comprises:
   uploading at least one of the plurality of presentation images from the client, the client being the local source; and
   loading at least one of the plurality of presentation images from a database, the database being the remote source.

10. The method of claim 1 wherein accessing the plurality of presentation images comprises:

loading at least one of the plurality of presentation images from a computer-readable medium, the computer-readable medium being one of the one or more specified sources.

11. The method of claim 1 further comprising:
saving the visual presentation on a computer-readable medium.

12. The method of claim 1, wherein the specifying from the at least one source of the plurality of sources comprises:
sending a web page to the client, the web page identifying parameters that are used for accessing the plurality of presentation images.

13. The method of claim 1, wherein prior to accessing the plurality of presentation images, the method further comprises:
specifying whether the visual presentation appears in black-and-white or color.

14. A first non-transitory computer-readable medium having computer-executable instructions to cause a processor of a server to create a visual presentation by performing operations comprising:
determining one or more sources of a plurality of sources from which to access a plurality of presentation images, the plurality of sources including a remote source and a local source;
accessing the plurality of presentation images from the one or more specified sources, the plurality of presentation images having inconsistent presentation attributes;
arranging the plurality of presentation images according to characteristics preselected by a client, the characteristics including at least three of a distance, a perspective, a magnification, and an angle;
organizing the plurality of presentation images in the visual presentation, wherein organizing includes automatically modifying the inconsistent presentation attributes of the plurality of presentation images to have consistent presentation attributes, wherein modifying the inconsistent presentation attributes of the plurality of presentation images includes modifying the inconsistent presentation attributes including an exposure; and
requesting and receiving compensation from the client before the visual presentation is sent to the client, an amount of compensation varies depending on which sources of the plurality of sources are accessed to retrieve the plurality of presentation images, where the remote source is more expensive to access than the local source.

15. The first non-transitory computer-readable medium of claim 14, wherein the at least three characteristics includes the magnification if the visual presentation is to zoom away from a location.

16. The first non-transitory computer-readable medium of claim 14, wherein modifying the inconsistent presentation attributes of the plurality of presentation images includes modifying the inconsistent presentation attributes including a size and a color.

17. The first non-transitory computer-readable medium of claim 14 having computer-executable instructions further comprising: accessing an address for a location.

18. The first non-transitory computer-readable medium of claim 14 having computer-executable instructions further comprising: accessing location coordinates for a location.

19. The first non-transitory computer-readable medium of claim 14 having computer-executable instructions further comprising: accessing additional information, wherein the additional information is viewing preferences are selected by the client and affect the appearance of the visual presentation.

20. The first non-transitory computer-readable medium of claim 14 having computer-executable instructions further comprising: uploading the plurality of presentation images from the client, the client being the local source.

21. The first non-transitory computer-readable medium of claim 14 having computer-executable instructions further comprising: loading the plurality of presentation images from a database, the database being the remote source.

22. The first non-transitory computer-readable medium of claim 14 having computer-executable instructions further comprising: uploading at least one of the plurality of presentation images from the client, the client being the local source; and
loading at least one of the plurality of presentation images from a database, the database being the remote source.

23. The first non-transitory computer-readable medium of claim 14 having computer-executable instructions further comprising: loading at least one of the plurality of presentation images from a second computer-readable medium.

24. The first non-transitory computer-readable medium of claim 14 having computer-executable instructions further comprising: sending the visual presentation to the client.

25. The first non-transitory computer-readable medium of claim 14 having computer-executable instructions further comprising: saving the visual presentation on a second computer-readable medium.

26. The first non-transitory computer-readable medium of claim 14 having computer-executable instructions further comprising: specifying how quickly the visual presentation zooms in or out if the distance or magnification characteristic from the group is selected.

27. The first non-transitory computer-readable medium of claim 14 having computer-executable instructions further comprising: specifying how quickly the visual presentation pans around a location if the perspective or angle characteristic from the group is selected.

28. The first non-transitory computer-readable medium of claim 14 having computer-executable instructions further comprising: specifying whether the visual presentation appears in black-and-white or color.

29. A computerized system comprising:
means for accessing a plurality of presentation images from at least one source of a plurality of sources, the plurality of sources including a source remotely located from the computerized system and a source local to the computerized system;
means for receiving information identifying characteristics to produce a visual presentation from a client, the characteristics including a distance and a magnification;
means for arranging the presentation images according to the characteristics provided by the client;
means for organizing the plurality of presentation images in the visual presentation, wherein organizing includes automatically modifying inconsistent presentation attributes of the plurality of presentation images to have consistent presentation attributes;
means for modifying the inconsistent presentation attributes of the plurality of presentation images, the presentation attributes including exposure; and
means for receiving compensation from the client before the visual presentation is sent to the client, an amount of compensation varies depending on which sources of a plurality of sources are accessed to retrieve the plurality of presentation images, the source remotely located from the computerized system is more expensive to access than a source local to the computerized system.

30. The computerized system of claim 29 further comprising:
   means for modifying at least one of the inconsistent presentation attributes of the plurality of presentation images, the presentation attributes being size.

31. A method for displaying images comprising:
   selecting at least one characteristic being from a group including a distance, a perspective, a magnification, and an angle, the selecting being based on information provided by a client;
   specifying how quickly a visual presentation zooms in or out if the distance or magnification characteristic from the group is selected;
   accessing a plurality of presentation images, one or more of the plurality of presentation images having inconsistent presentation attributes;
   arranging the plurality of presentation images by a server according to the at least one characteristic;
   organizing the plurality of presentation images in a visual presentation, wherein organizing includes automatically modifying the inconsistent presentation attributes of the one or more of the plurality of presentation images to have consistent presentation attributes, wherein modifying the inconsistent presentation attributes of the one or more of the plurality of presentation images includes modifying exposure for the one or more of the plurality of presentation images to be consistent throughout the plurality of presentation images; and
   receiving compensation from the client before the visual presentation is sent to the client, an amount of compensation varies depending on which sources of a plurality of sources are accessed to retrieve the plurality of presentation images, the plurality of sources including a remote source and a local source, where the remote source is more expensive to access than the local source.

32. The method of claim 31, wherein prior to accessing the plurality of presentation images, the method further comprises:
   specifying how quickly the visual presentation pans around a location if the perspective or angle characteristic from the group is selected.

33. The method of claim 31, wherein prior to accessing the plurality of presentation images, the method further comprises:
   specifying whether the visual presentation appears in black-and-white or color.

* * * * *